(12) United States Patent
Chen

(10) Patent No.: US 11,402,938 B1
(45) Date of Patent: Aug. 2, 2022

(54) FINGERPRINT DETECTION APPARATUS, SYSTEM, AND METHOD

(71) Applicant: Japan Display Inc., Tokyo (JP)

(72) Inventor: Chung-Kai Chen, San Jose, CA (US)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/170,176

(22) Filed: Feb. 8, 2021

(51) Int. Cl.
  *G06F 3/041* (2006.01)

(52) U.S. Cl.
  CPC ........ *G06F 3/0412* (2013.01); *G06F 3/04166* (2019.05); *G06F 3/04182* (2019.05)

(58) Field of Classification Search
  CPC .......... G06F 3/041–047; G06F 3/0446; G06F 3/044; G06F 3/043; G06F 3/0416; G06F 3/04166; G06F 2203/041
  See application file for complete search history.

(56) References Cited

U.S. PATENT DOCUMENTS

| | | | |
|---|---|---|---|
| 8,866,500 B2 | 10/2014 | Kremin et al. | |
| 2013/0207906 A1* | 8/2013 | Yousefpor | G06F 3/0446 345/173 |
| 2016/0148034 A1* | 5/2016 | Kremin | G06K 9/00033 382/124 |

OTHER PUBLICATIONS

Park et al., "A Noise-Immunity-Enhanced Analog Front-End for 36×64 Touch-Screen Controllers With 20-Vpp Noise Tolerance at 100 kHz", IEEE Journal Of Solid-State Circuits, vol. 54, No. 5, May 2019, pp. 1497-1510.

* cited by examiner

*Primary Examiner* — Sanjiv D. Patel
(74) *Attorney, Agent, or Firm* — Xsensus LLP

(57) ABSTRACT

A touch detecting system includes a detection panel that generates a detection signal based on a received transmitter signal and an object placed in proximity to a detection panel. The detection signal includes information about the object. A receiver circuit receives the detection signal and includes a control circuit that determines, each time a transmitter start signal becomes active, a delay time to add when generating an adaptive control signal. The transmitter start signal indicates a start of operation of the transmitter signal. A mixer circuit receives the detection signal and the adaptive control signal, and outputs a demodulated detection signal based on the detection signal and the adaptive control signal. An output circuit receives the demodulated detection signal and outputs an output detection signal that includes the information about the object placed in proximity to the detection panel.

17 Claims, 18 Drawing Sheets

FINGERPRINT DETECTION APPARATUS, SYSTEM, AND METHOD

FIELD OF THE INVENTION

The present disclosure relates generally to an apparatus and system that detects a touch of a human and may also uniquely identify the human by a fingerprint.

BACKGROUND OF INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

With more and more activities done online, biometric identification is becoming increasingly important. One of the more secure ways to implement biometric identification is fingerprint matching. Capacitive fingerprint sensors are widely used in modern electronic devices. The readout circuit of a capacitive touch and fingerprint sensor may include a transmitter, amplifier, mixer, lowpass filter and ADC (Analog to Digital Converter). First, the mutual capacitance value is modulated to a TX frequency by a transmitter and amplified by an amplifier. Next, the mixer demodulates the signal back to base band and a lowpass filter filters out noise at high frequency. Finally, the ADC converts the analog signal in base band into a digital signal for post processing in the digital domain.

SUMMARY OF INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

An embodiment of the invention includes touch detecting system comprising: a transmitter circuit that generates a transmitter signal; a detection panel that receives the transmitter signal and generates a detection signal based on the transmitter signal and an object placed in proximity to the detection panel, the detection signal including information about the object placed in proximity to the detection panel; and a receiver circuit that receives the detection signal, the receiver circuit including a control circuit that determines, each time a transmitter start signal becomes active, a delay time to add when generating an adaptive control signal, the transmitter start signal indicating a start of operation of the transmitter signal, a mixer circuit that receives the detection signal and the adaptive control signal, and outputs a demodulated detection signal based on the detection signal and the adaptive control signal, and an output circuit that receives the demodulated detection signal and outputs an output detection signal that includes the information about the object placed in proximity to the detection panel.

According to another embodiment of the invention, each time the transmitter start signal becomes active, the control circuit determines a phase delay of the adaptive control signal based on the detection signal, a first free running clock signal, and the transmitter start signal.

According to another embodiment the invention further comprises at least one amplifier stage that amplifies the detection signal for use by the mixer circuit.

According to another embodiment the invention further comprises a control circuit that determines to activate the transmitter start signal when a touch detection operation should begin.

According to another embodiment of the invention, the control circuit is configured to determine a different phase delay of the adaptive control signal each time the transmitter start signal becomes active.

According to another embodiment of the invention, the information about the object placed in proximity to the detection panel includes information about a location of the object with respect to the detection panel.

According to another embodiment of the invention, the object placed in proximity to the detection panel is a finger, and the information about the object placed in proximity to the detection panel includes information that uniquely identifies a fingerprint of the finger. According to another embodiment of the invention, the output circuit includes a low pass filter that receives the demodulated detection signal and outputs a low pass filtered signal as the output detection signal.

According to another embodiment of the invention, the control circuit includes: an enable generating circuit that outputs a comparator enable signal based on a first free running clock signal and the transmitter start signal; a comparator circuit that outputs a comparison output signal based on the comparator enable signal and the detection signal; a delay determining circuit that outputs a clock enable signal based on the comparison output and the comparator enable signal; and a clock generator circuit that outputs the adaptive control signal based on the clock enable signal.

According to another embodiment of the invention, the enable generating circuit outputs the comparator enable signal to become active on a predetermined cycle (e.g., a fifth cycle, a fourth cycle, a sixth cycle or any other cycle) of the first free running clock signal after the transmitter start signal becomes active.

According to another embodiment of the invention, the comparator circuit outputs the comparison output signal to become active when the detection signal transitions from negative to positive and inactive when the detection signal transitions from positive to negative, the delay determining circuit outputs the clock enable signal to become active after at least one cycle in which the comparison output signal becomes active and inactive, and the delay determining circuit outputs the clock enable signal to become inactive after the transmitter start signal becomes inactive.

According to another embodiment of the invention, the clock generator circuit outputs the adaptive control signal as a second free running clock only while the clock enable signal is active.

According to another embodiment of the invention, the enable generating circuit includes five D flip-flops connected in series, with the transmitter start signal connected to a reset input of each of the five D flip-flops connected in series, the first free running clock signal connected to a clock input of each of the five D flip-flops connected in series, an always active signal connected to a D input of the first D flip-flop in the five D flip-flops connected in series, a non-inverting output of each of the first, second, third, and fourth of the five D flip-flops connected in series being connected to a D input of the second, third, fourth, and fifth D flip-flops connected in series, respectively, and a non-inverting output of the fifth D flip-flop connected in series outputting the comparator enable signal.

According to another embodiment of the invention, the delay determining circuit includes two D flip-flops connected in series, an always active signal connected to a D input of a first of the two D flip flops connected in series, the comparator output signal connected to a clock input of each of the two D flip-flops connected in series, the comparator enable signal connected to a reset input of each of the two D flip-flops connected in series, a non-inverting output of the first D flip-flop of the two D flip-flops connected in series is connected to a D input of the second D flip-flop of the two D flip-flops connected in series, and a non-inverting output of the second D flip-flop of the two D flip-flops connected in series is output as the clock enable signal.

According to another embodiment of the invention, the delay determining circuit includes a D flip-flop and a delay line, an always active signal connected to a D input of the D flip-flop, the comparator output signal connected to a clock input of the D flip-flop, the comparator enable signal connected to an input of the delay line, an output of the delay line connected to a reset input of the D flip-flop, and a non-inverting output of the D flip-flop is output as the clock enable signal.

According to another embodiment of the invention, the delay line produces a propagation delay of a signal from the input of the delay line to the output of the delay line that is greater than a propagation delay of the comparator.

Another embodiment of the invention includes a touch detecting receiver that receives a detection signal indicating information about an object placed in proximity to the detection panel from a detection panel and a transmitter start signal from a controller indicating a start of operation of the transmitter signal, the touch detecting receiver circuit comprising: a control circuit that determines, each time the transmitter start signal becomes active, a delay time to add when generating an adaptive control signal; a mixer circuit that receives the detection signal and the adaptive control signal, and outputs a demodulated detection signal based on the detection signal and the adaptive control signal; and an output circuit that receives the demodulated detection signal and outputs an output detection signal that includes the information about the object placed in proximity to the detection panel.

Another embodiment of the invention includes a method of detecting an object placed in proximity to a detection panel, the method comprising: receiving a detection signal from the detection panel, the detection signal including information about the object placed in proximity to the detection panel; receiving a transmitter start signal from a controller indicating a start of operation of the transmitter signal; determining, each time the transmitter start signal becomes active, a delay time to add when generating an adaptive control signal; generating the adaptive control signal; receiving, by a mixer circuit, the detection signal and the adaptive control signal; outputting, from the mixer circuit, a demodulated detection signal based on the detection signal and the adaptive control signal; and outputting the demodulated detection signal as an output detection signal that includes information about the object placed in proximity to the detection panel.

BRIEF DESCRIPTION OF THE DRAWINGS

The scope of the present disclosure is best understood from the following detailed description of exemplary embodiments when read in conjunction with the accompanying drawings, wherein.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

One difficulty when implementing a touch or fingerprint detection process (hereinafter interchangeably referred to as either fingerprint or touch detection) is the control of mixer operation, because the mixer's control signal needs to be based on propagation delay from transmitter to mixer input. However, the value of the propagation delay is unknown before manufacture and may depend on various and varying factors. A conventional solution includes performing a one-time calibration after manufacture and choosing the correct number of delay cells in series delay circuit to match the phase difference between mixer's control signal and TX (transmitter) signal to propagation delay. In this way, the mixer control signal is essentially a delayed TX signal. But this solution disadvantageously requires an additional testing step during manufacture or setup, and the propagation delay can also vary with age or different operating conditions.

An embodiment of the invention may advantageously generate an adaptive mixer control signal without calibration and can appropriately vary and/or determine a delay timing of the adaptive control signal each time when fingerprint or touch sensing function is required to thereby advantageously account for changes in age or operating conditions.

Figure 1:
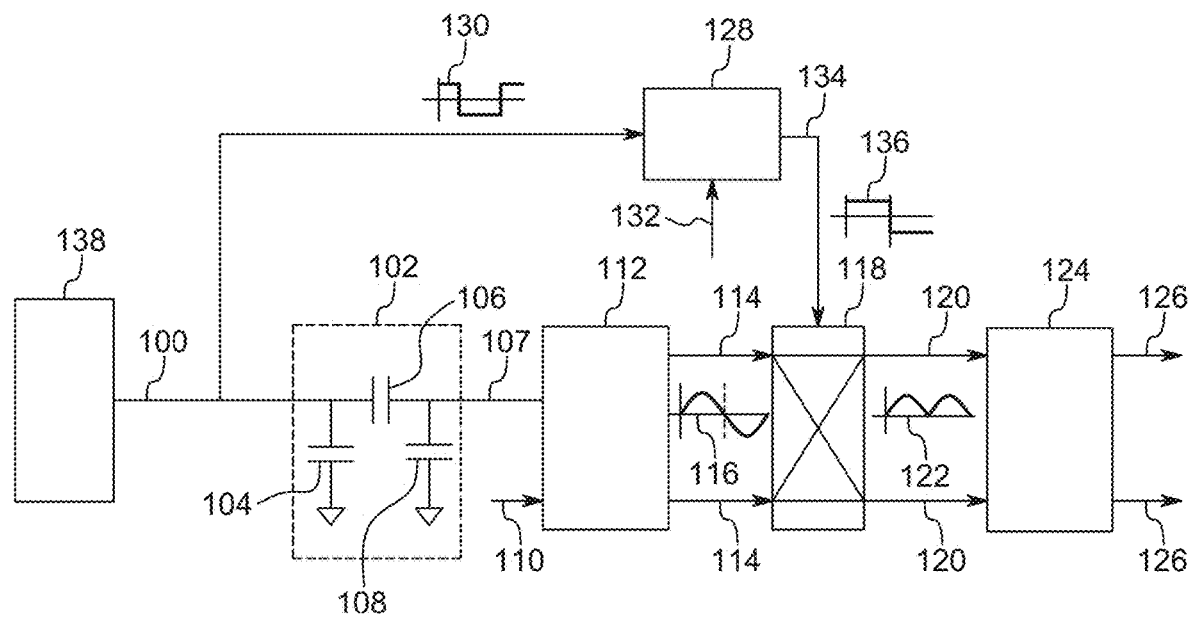
FIG. 1 is a block diagram of a first embodiment of a fingerprint detection apparatus.

FIG. 1 is a block diagram of a first embodiment of a fingerprint detection apparatus including a detection panel 102, an amplifier stage 112, a mixer 118, a low pass filter 124, and a configurable delay circuit 128. The apparatus detects a fingerprint of a human and may be used for uniquely identifying the human and can be used to detect human touch in user interface applications.

The detection panel 102 is a physical region of that may be arranged in proximity to, or in direct contact with, a human finger and includes a capacitive sensor having an array of capacitive elements, which are represented in this example by equivalent capacitors 104, 106, and 108, which may be used by the apparatus to detect the proximity of the human finger and also detect the proximity and relative locations of ridges and valleys of a fingerprint on the human finger (hereinafter referred to as fingerprint features). The detection panel 102 may form a portion of a visual display element, for example, a transparent overlay on any type of display, such as a liquid crystal display (LCD) or an organic light emitting-diode display (OLED). In this example, the detection panel 102 receives a time varying fingerprint transmitter signal TX 100, shown by exemplary signal 130, which propagates through the array of capacitive elements and is output as detection signal 107. The propagating signal is affected by the relative proximity and location of the fingerprint features.

The transmitter signal TX 100 is generated by a transmitter circuit 138 to be a time varying balanced signal which is active only when fingerprint detection is desired by the device that includes the fingerprint detection apparatus. A frequency of the signal TX 100 may be varied by the transmitter circuit 138, before or during normal operation, to optimize a noise reduction strategy as discussed further below. For example, the transmitter circuit 138 may change the frequency of signal TX 100, within a range of possible frequencies that may be produced by the transmitter circuit, to avoid a frequency of a noise source, such as a charger or power supply noise. The amplifier stage 112 includes one or more charge amplifier and programmable gain amplifier stages. The amplifier stage 112 receives the detection signal 107 from the detection panel 102 and a reference common mode voltage Vcm 110 to generate an amplified differential detection signal 114, shown by an exemplary waveform 116. The amplifier stage 112 increases the amplitude of the detection signal 107, for example, to improve a signal to noise ratio.

The configurable delay circuit 128 receives the transmitter signal TX 100 and a register setting signal 132. The register setting signal 132 indicates how many delay cells inside the configurable delay circuit 128 are used and thus how much propagation delay mixer control signal 134 has relative to TX signal 100. Register setting signal 132 is implemented as a series of 1s and 0s, or as an encoded number, or as a series of encoded fields, including a predetermined indication of the number of delay cells to be used that is selected at the time of manufacture.

The actual propagation delay resulting from the propagation of the TX 100 signal through the detection panel 102 may be a function of a variety of external factors, such as manufacturing variations in the circuit and panel components (e.g., conductivity of conductors, thickness of panel layers), environmental conditions (e.g., temperature, humidity, and pressure), power supply voltages, properties of the human finger (e.g., dirt, oil, moisture, clothing, etc.), and circuit age or history (e.g., number of cycles of use, elapsed time since manufacture). Thus, the information corresponding to the propagation delay is determined by a calibration process that may use dedicated or external test equipment operating outside the normal operating mode. Since the external factors noted above may change over time, the configuration process may be required to be performed at various times during the use and lifetime of the apparatus.

The configurable delay circuit 128 outputs a mixer control signal 134, shown by exemplary signal 136, which is a delayed version of the received transmitter signal TX 100. The configurable delay circuit 128 delays the TX 100 signal by a duration of time based on information provided in the register setting signal 132, to produce the mixer control signal 134. For example, the configurable delay circuit 128 includes a plurality of serially connected delay elements that are enabled or disabled according to the register setting signal 132 to vary a propagation delay applied to the TX 100 signal before outputting the mixer control signal 134. The mixer control signal 134 has the same frequency as TX 100 and the phase of the mixer control signal 134 relative to TX 100 corresponds to the propagation delay through the detection panel 102 for proper detection of the fingerprint. For example, the signal across capacitor 106, Cm, may be attenuated or even completely lost when a phase error in the mixer control signal 134 approaches $\pi/2$.

The mixer 118 receives the amplified differential detection signal 114 and the mixer control signal 134 from the configurable delay circuit 128. The mixer 118 uses the mixer control signal 134 to provide control timing for demodulating the amplified differential detection signal 114. Based on the received amplified differential detection signal 114 and the mixer control signal 134, the mixer 118 demodulates the amplified differential detection signal 114 to output a demodulated detection signal 120, shown by an exemplary waveform 122.

The low pass filter 124 is a filter that performs noise reduction to remove undesirable signal components from the demodulated detection signal 120 to produce a filtered detection signal 126. The low pass filter 124 may be implemented as an analog filter circuit or a digital filter circuit and is preferably implemented as an analog filter circuit. The noise reduction is advantageously performed as early as possible in the signal flow, and advantageously, before the detection signal is converted into a digital domain. In an alternative embodiment, where further noise reduction is not needed, the low pass filter 124 may be omitted.

Disadvantageous noise sources include noise resulting from the signal path circuits themselves (e.g., thermal noise, 1/f noise, etc.), signals outside the signal path (e.g., various clock and high frequency signal used for other functions within a system that includes the fingerprint detection apparatus), and the external environment (e.g., visual display panel refresh/strobe signals, processor signals, charger noise, etc.), at least because these outside signal can be disadvantageously coupled into the signal path anywhere between the charge amplifier and the mixer.

The filtered detection signal 126 may be analyzed by another system component (including, for example, an A/D converter and/or logic circuit) to detect and/or identify a human fingerprint in proximity to the detection panel 102 based, at least in part, on the filtered detection signal 126.

Figure 2:
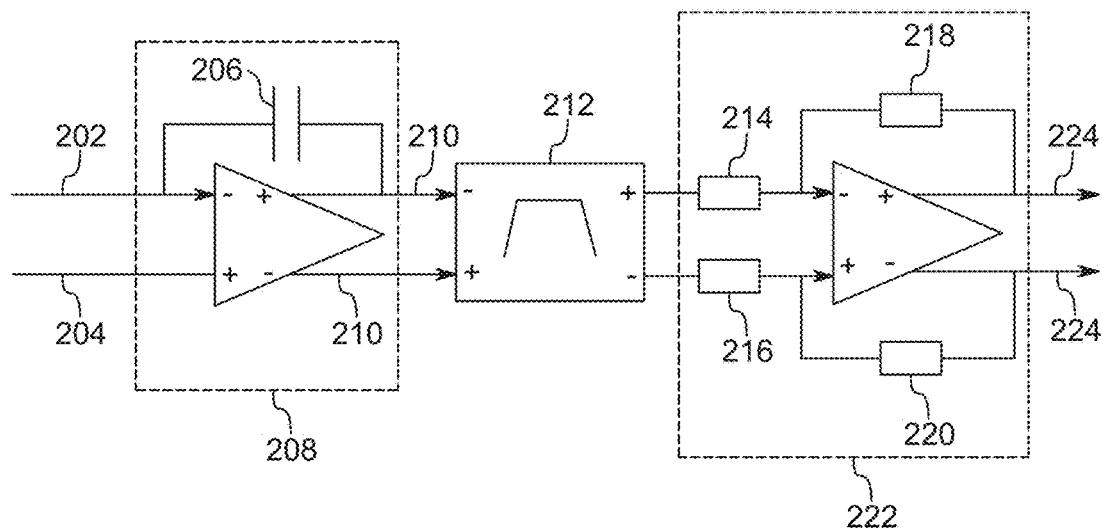
FIG. 2 is a circuit diagram of an example of an amplifier stage.

FIG. 2 shows an example of the amplifier stage 112 including a charge amplifier 208, capacitor 206, band-pass filter 212, resistors 214, 216, 218, and 220, and programmable gain amplifier (PGA) 222. Although the example of FIG. 2 shows only one stage each of charge amplifier 208, band-pass filter 212, and PGA 222, the embodiment may include more than one stage of one or more serially connected stages of the charge amplifier 208, band-pass filter 212, and PGA 222. In this example, the charge amplifier 208 receives Vcm 204 and detection signal 202 from the detection panel 102. The PGA 222 outputs the amplified differential detection signal 224 provided to the mixer 118. On the other hand, if signal to noise ratio is adequate, band-pass filter 212 and PGA 222 can be omitted. The first stage charge amplifier 208 may be necessary to convert charge signal 107 into voltage signal 114. Alternatively, the charge amplifier used in this example can be replaced by a transimpedance amplifier or current conveyor circuits.

In the example of FIG. 2, the charge amplifier 208 converts a single ended input detection signal 202 from the detection panel 102 into a differential signal in a first stage of the charge amplifier 208. However, the amplification signal path of the amplifier stage 112 may alternatively be implemented entirely as a single ended amplifier by biasing all stages' positive inputs with Vcm.

Figure 3:
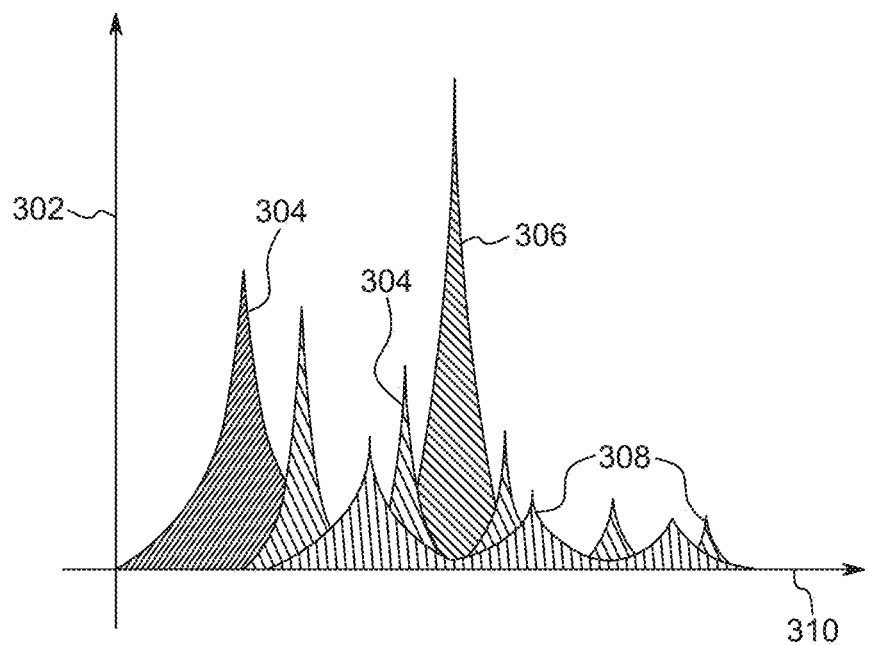
FIG. 3 is a graph of an example of a detection signal in the frequency domain.
Figure 4:
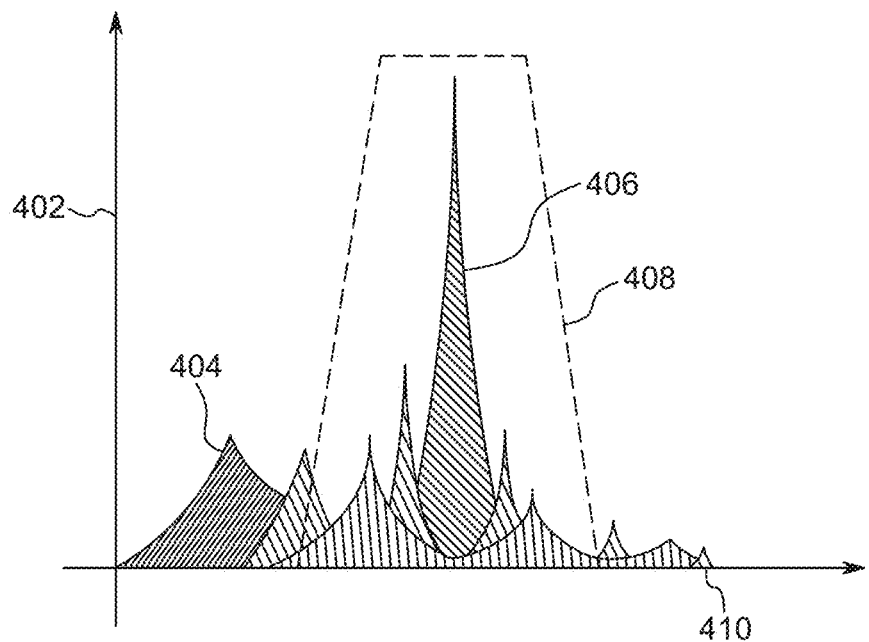
FIG. 4 is a graph of an example of an amplified differential detection signal in the frequency domain.
Figure 5:
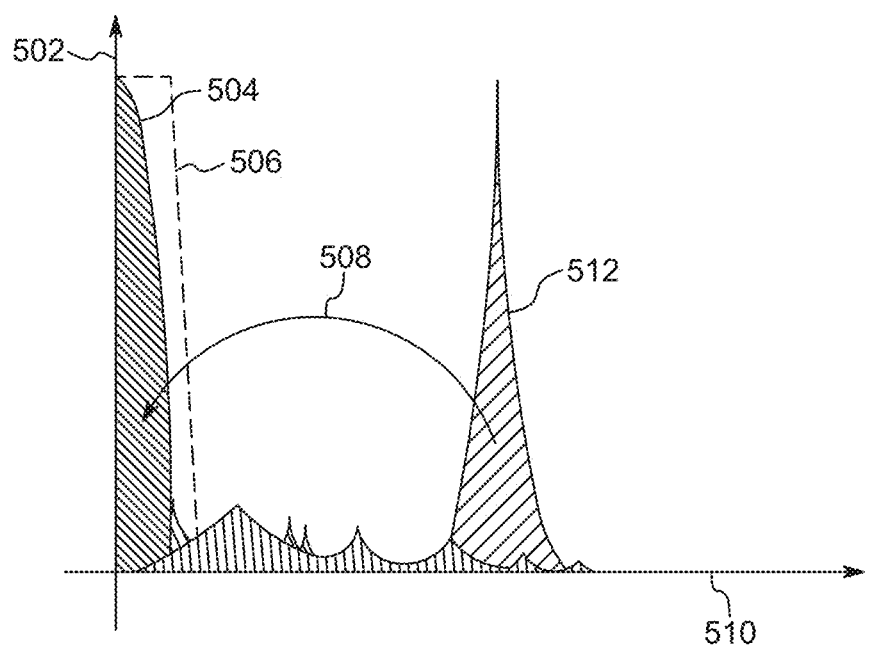
FIG. 5 is a graph of an example of a filtered detection signal in the frequency domain.

FIGS. 3-5 illustrate a fingerprint noise reduction strategy of a fingerprint detection apparatus according to the present disclosure.

FIG. 3 illustrates an exemplary graph of Power Spectral Density (PSD) 302 versus frequency 310 for a content of a detection signal 107 in a Touch Screen Panel (TSP) according to an embodiment of the invention. The detection signal 107 includes the desirable mutual capacitive signal Cm 306 that is modulated at a frequency of signal TX 100, which may preferably be controlled and/or selected to avoid a frequency of charger noise and low frequency 1/f noise. The detection signal 107 in this example, also includes disadvantageous noise interference 304 and 308.

FIG. 4 illustrates an exemplary graph of amplified differential detection signal 114 output from the amplification stage 112, which includes the mutual capacitance signal at the frequency of TX 100 (406), and may attenuate noise above and below the band pass frequency range 408. FIG. 5 illustrates an exemplary graph of filtered detection signal 126 output by the low-pass filter 124. The modulated mutual capacitance signal 512 is down converted (i.e., shifted in frequency domain) to be in the base band frequency range 504 by the demodulation 508 performed by the mixer 118. The mixer also upconverts all the low frequency noise in the signal. The low-pass filter 124 passes the mutual capacitance signal at the base band and attenuates/filters out the higher frequency signals outside of base band frequency range 506.

In the first embodiment of a fingerprint detection apparatus according to FIG. 1, the configurable delay circuit 128 produces the mixer control signal 134 based on the register setting signal 132 which is determined by a calibration process. Such a process may be time consuming, may cause the apparatus to be unavailable periodically, and may result in an apparatus that is inaccurate at times between calibrations. Further, such an embodiment may not advantageously redetermine an appropriate delay to be applied to the mixer control signal 134 each time touch detection is required.

Figure 6A:
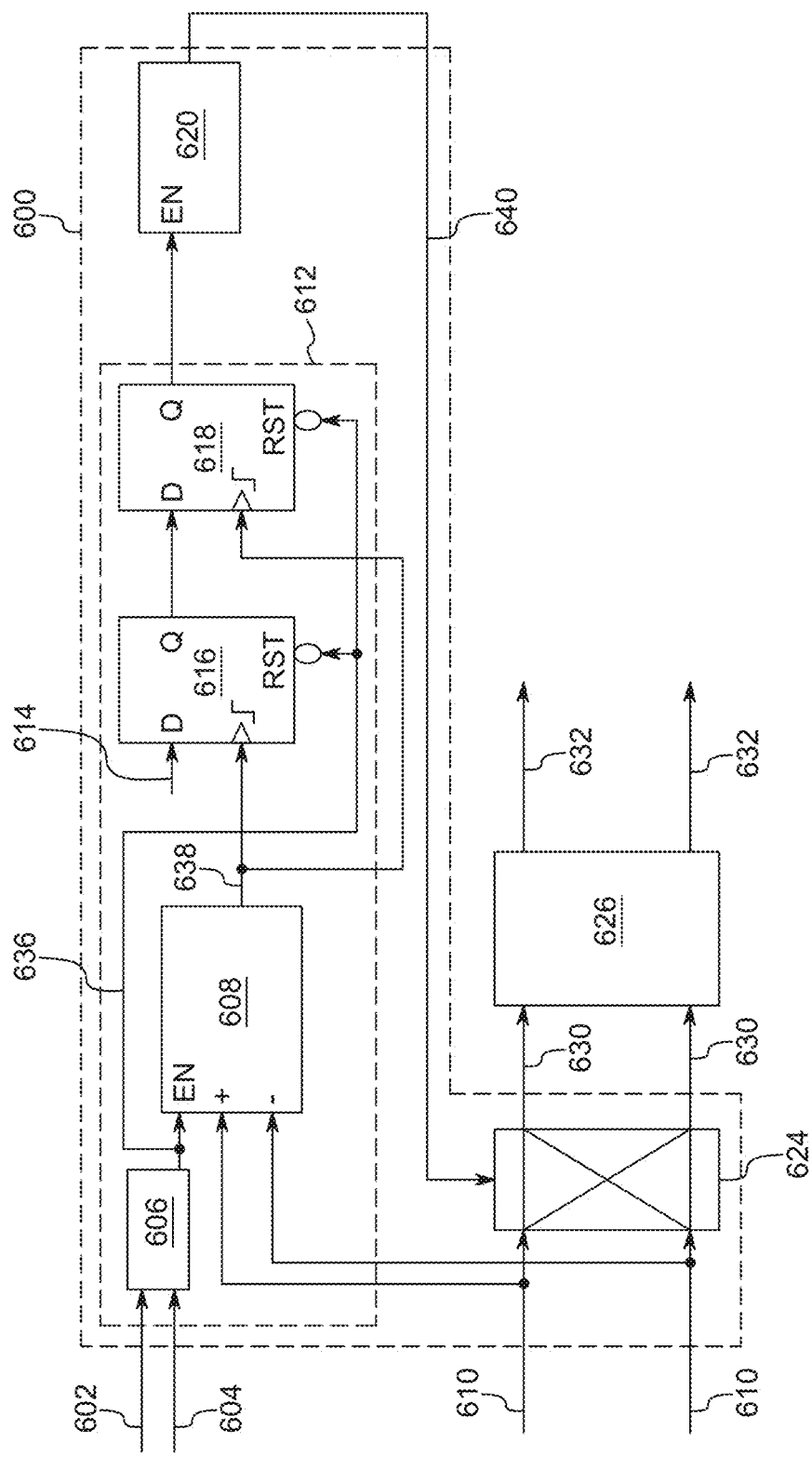
FIG. 6A is a block diagram of a second embodiment of a fingerprint detection apparatus.

FIG. 6A illustrates a second embodiment of the fingerprint detection apparatus including improvements that may advantageously reduce or avoid the need for a calibration process. According to the embodiment of FIG. 6A, the fingerprint detection apparatus includes an improved mixer circuit 600, including mixer 624, and low-pass filter 626.

Mixer 624 receives amplified differential detection signal 610, and the low-pass filter 626 outputs filtered detection signal 632. Mixer 624 and low-pass filter 626 may be implemented as discussed above with respect to mixer 118 and low-pass filter 124, respectively. Also, amplified differential detection signal 610, demodulated detection signal 630, and filtered detection signal 632 correspond to the amplified differential detection signal 114, demodulated detection signal 120, and filtered detection signal 126, respectively.

The improved mixer circuit 600 includes an enable generating circuit 606, a comparator 608, D flip-flops 616 and 618, collectively forming a phase detector 612. The improved mixer circuit 600 also includes a clock generator circuit 620 and the original mixer 624 itself.

The enable generating circuit 606 receives a signal TX_Start 602 and free-running clock CLK 604. TX_Start 602 is provided from a controller and becomes active at a time when fingerprint detection is required and determined by a higher level function performed by the controller. For example, TX_Start 602 may become active under the control of the controller when a user attempts to unlock a smartphone. CLK 604 is a free-running clock signal. The enable generating circuit 606 outputs a comparator enable signal EN_COMP 636, which is normally low (inactive), and remains low for at least 1 TX period after TX starts, to allow the mixer input signals to stabilize.

The comparator 608 receives the differential detection signal 610 and EN_COMP 636. The comparator 608 outputs a comparison output signal 638 that is high when the differential detection signal 114 is positive and low when differential detection signal 114 is negative.

A D input of the D flip-flop 616 receives VDD 614 (i.e., always active signal). A clock input of the D flip-flop 616 receives comparator 608, and a RST input of the D flip-flow 616 receives EN_COMP 636. A D input of the D flip-flop 618 receives a non-inverted Q output from D flip-flop 616. The CLK and RST inputs of the D flip-flop 618 are tied to the same signals as the corresponding CLK and RST inputs of the D flip-flop 616. The comparator 608 is used to sense the positive input crossing, not input states, and therefore, two D flip flops are provided to ignore the first comparator output going high. Further, two D flip flops are used to ignore a comparator going high immediately after EN_COMP goes high, in the event that positive comparator input inp 1010>negative comparator input inn 1012 at that moment (See FIG. 10).

An enable input EN of the CLK Generator 620 receives the non-inverted Q output from D flip-flop 618. An output of the CLK Generator 620 is provided as an adaptive mixer control signal 640 to the mixer 624.

Figure 6B:
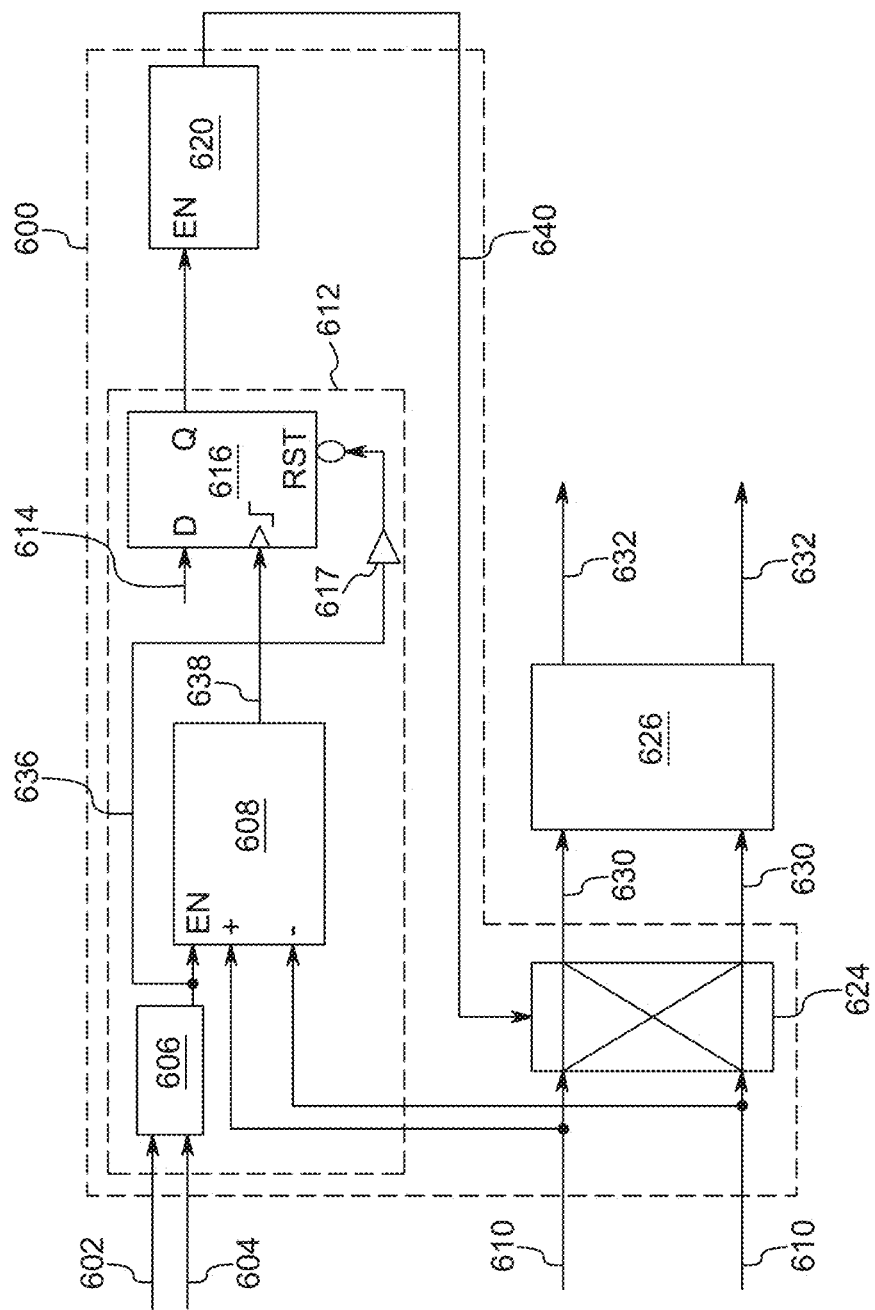
FIG. 6B is a block diagram of a third embodiment of a fingerprint detection apparatus.

FIG. 6B illustrates an alternative implementation of the fingerprint detection apparatus in FIG. 6A. According to the embodiment in FIG. 6B, a delay cell 617 is inserted between the output of the enable generating circuit 606 and the RST input of the D flip-flop 616. The delay cell 617 adds a delay of duration D. This delay duration D is preferably longer than the comparator 608's propagation delay, which when determined by Slew Rate (SR) is $$\frac{V_{OH} - V_{OL}}{2SR}$$

and when determined by linear response is $$\tau_c \ln\left(\frac{1}{1 - \frac{V_{OH} - V_{OL}}{2A_V(0)V_{in}}}\right).$$

The delay D is preferably as short as possible, and longer than the comparator's propagation delay. The delay D is optimally less than 1 TX period. According to this embodiment, even if comparator 608's output 638 becomes HIGH immediately after its enable signal 636 becomes HIGH, this comparator output 638's rising edge will be ignored because D flip-flop 616's RST is still LOW due to the delay cell 617. The embodiment of FIG. 6B may result in a phase detector's response time that is advantageously shorter than the embodiment of FIG. 6A, because instead of two, only one D flip-flop is used.

The fingerprint detector apparatus according to FIG. 6A or FIG. 6B automatically generates an automatic mixer control signal 640 (aka, adaptive control signal) for controlling the operation of a mixer without requiring any calibration process. The adaptive mixer control signal 640 is generated each time after TX starts and phase detector 612 senses the current propagation delay from 100 to 114, so compared with the traditional one time calibration process done in the testing facility after manufacture, it can take variations such as temperature change and circuit aging into account.

Figure 7:
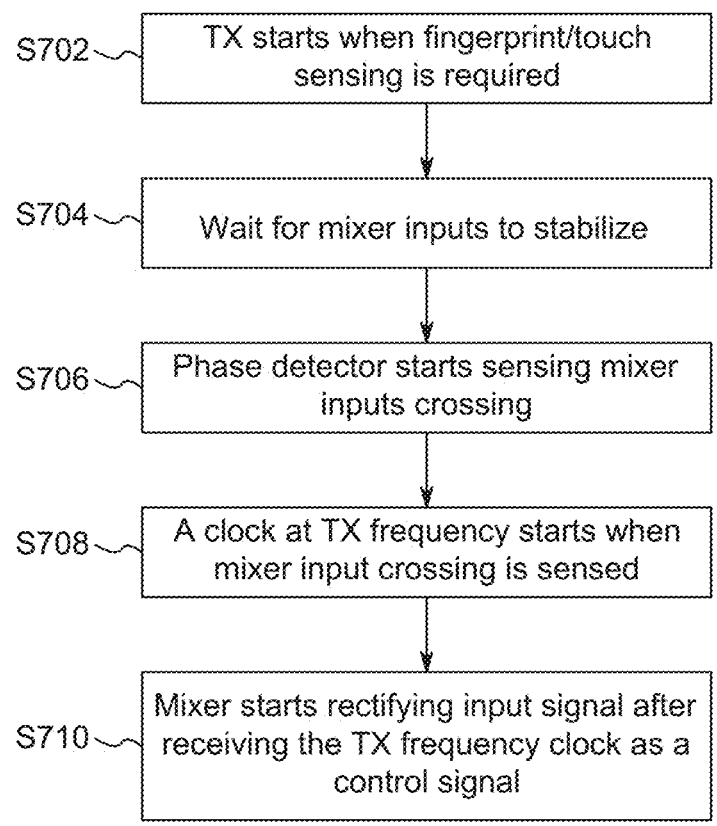
FIG. 7 describes a functionality of an operation of the second and third embodiments of the fingerprint detection apparatus.

An operation of an alternative embodiment of an improved mixer circuit is described functionally with respect to the example of FIG. 7. Such an embodiment may be implemented using a programmable processing circuit, logic circuits, or other circuits, for example a circuit including components as in the example of FIG. 6. According to this alternative embodiment, the signal TX 100 is first generated by the transmitter circuit 138 and received by the improved mixer circuit when the device that includes the fingerprint detection apparatus (e.g., a cell phone, a touch panel, etc.) determines to start fingerprint detection. A higher level function in a controller determines that fingerprint or touch detection is required, and transmitter signal TX 100 starts in step S702. Operation waits at step S704 a predetermined amount of time until the mixer inputs become stabilized. The predetermined amount of time is set to at least one TX period. For example, if the slowest TX frequency is 100 kHz, the predetermined amount of time is set to at least 10 us. The predetermined amount of time is determined in the design phase, or, if configurable, may be set in a register setting. In step S706, the phase detector in the improved mixer circuit starts sensing mixer input zero crossings, and in step S708 after a mixer input zero crossing is sensed, a clock at TX frequency starts. In step S710, the TX frequency clock in S708 is provided to the mixer as its control signal, and mixer starts to rectify its input signal. In step S706, the comparator is enabled and starts sensing, and in step S708, the clock generator starts generating a clock at TX frequency after comparator senses mixer input zero crossing. Thus, the automatically generated mixer control signal in S710 is able to rectify mixer input signal, i.e., make mixer output all positive or negative.

Figure 16:
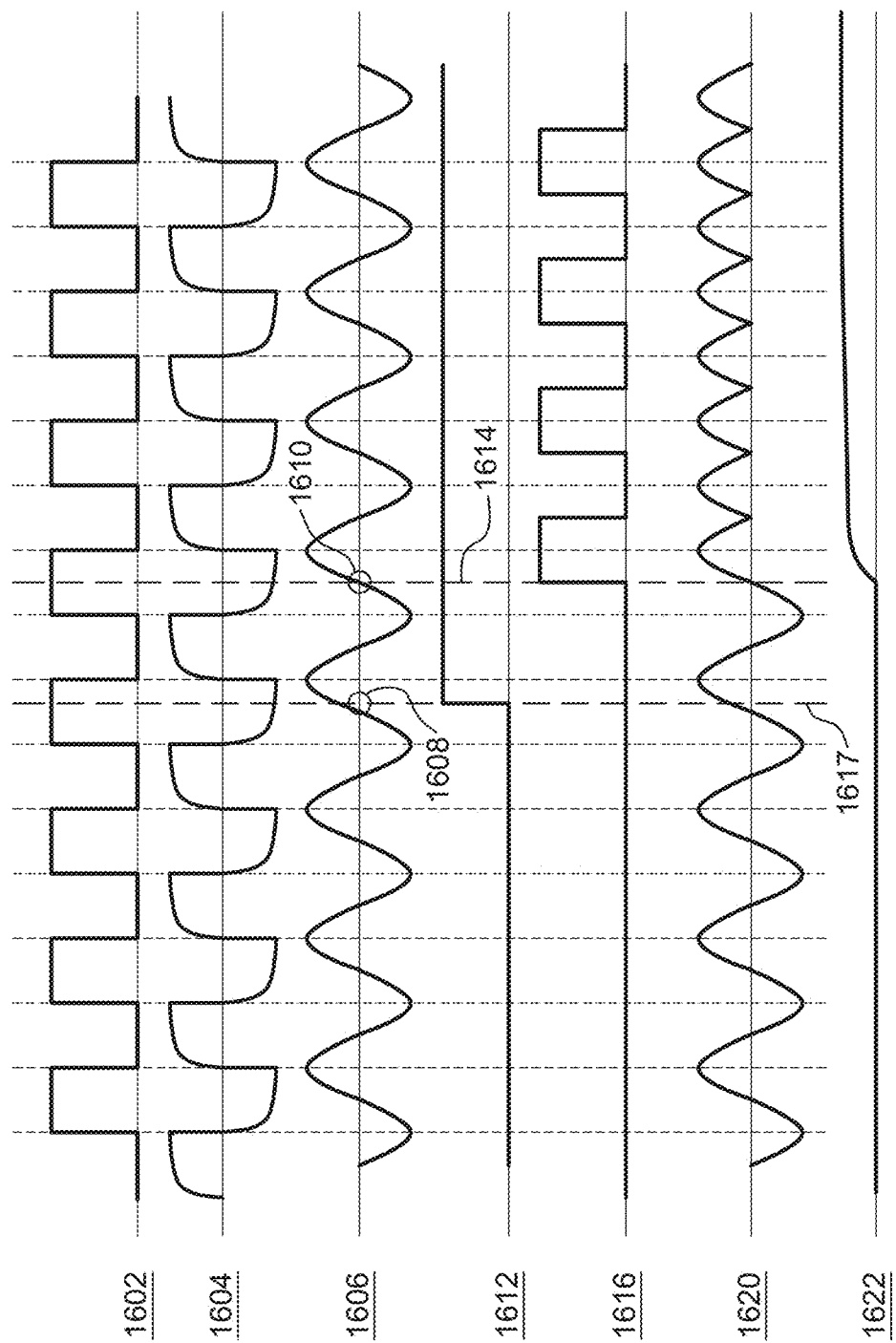
FIG. 16 shows a first example of operation of the fingerprint detector according to the second embodiment.
Figure 17:
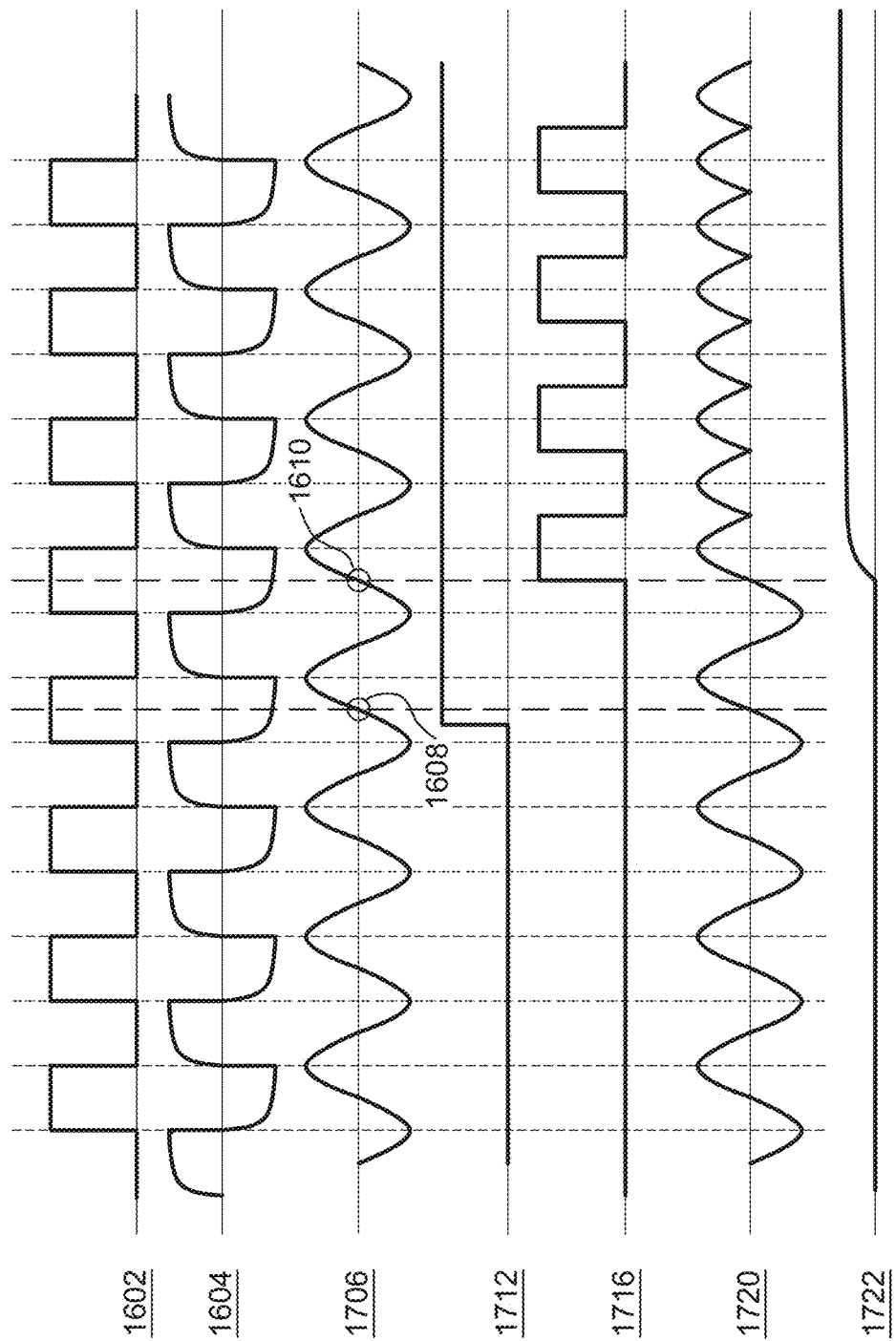
FIG. 17 shows a second example of operation of the fingerprint detector according to the second embodiment.

In embodiments according to FIGS. 6A, 6B, and 7, a delay time, which is measured from when the TX_Start goes active until the mixer begins to demodulate its input signal, is determined each time when a higher level function determines that a touch or fingerprint detection action should be initiated (i.e., each time the TX_Start signal goes active). The value of this delay time depends on the relative position of EN_COMP's rising edge to mixer input signal 114, so it is not the same every time. Furthermore, this delay time may be different each time touch or fingerprint detection action should be initiated, because EN_COMP doesn't go active at the same time each time TX_Start goes active. For example, in FIGS. 8 and 9, the delay time from TX_Start active to EN_COMP rising edge is any time between 16 to 20 us. In FIG. 16, EN_COMP goes active when mixer input is high and in FIG. 17, EN_COMP goes active when mixer input is negative. Therefore, the delay times from TX_Start to mixer starts to demodulate in FIGS. 16 and 17 are different.

Figure 8:
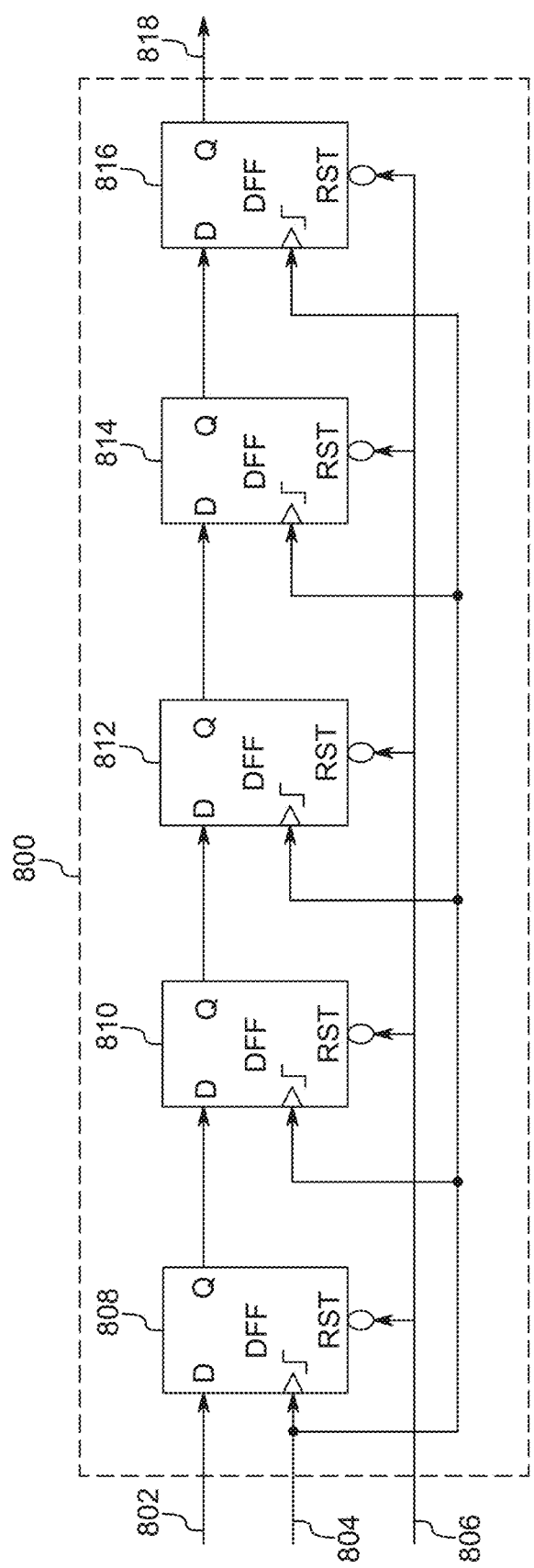
FIG. 8 is an example of an implementation of an enable generating circuit.
Figure 9:
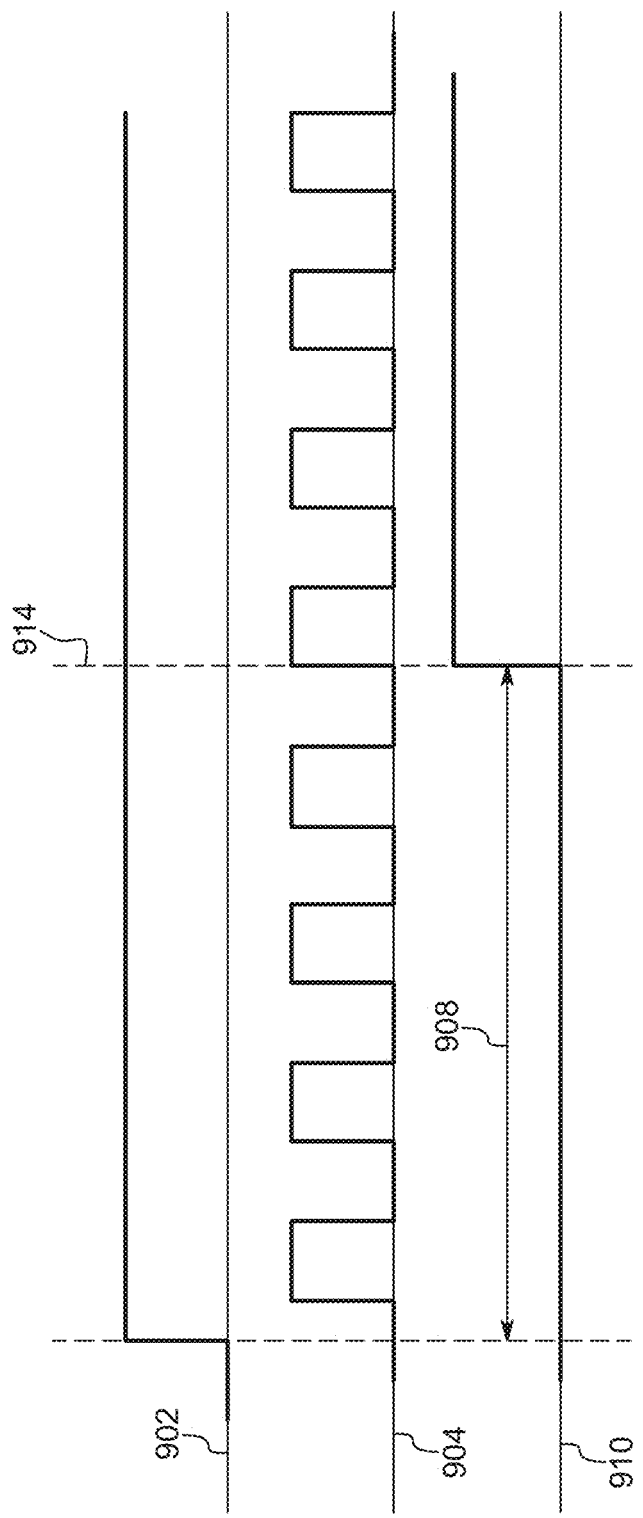
FIG. 9 shows an example of a signal operation during a beginning of operation of the enable generating circuit.

FIG. 8 shows an example of an implementation of an enable generating circuit 800 corresponding to the enable generating circuit 606. The enable generating circuit 800 includes D flip-flops 808, 810, 812, 814, and 816, each having a RST input connected to TX_Start 806, and each having a CLK input connected to a CLK 804 (e.g., a 250 kHz free-running clock). The D input of D flip-flop 808 is tied to VDD 802 (always active/high). The non-inverting Q output of each of D flip-flops 808, 810, 812, and 814 is connected to the D input of D flip-flop 810, 812, 814, and 816, respectively. The non-inverting Q output of D flip-flop 816 is output as EN_COMP 818. There are 5 D flip-flops in FIG. 8, but different number of D flip-flops can also be used. The number of D flip-flops can either be determined in the design phase or made configurable using switches and register settings, or, for example, made configurable like the configurable delay circuit 128. Alternatively, EN_COMP can also be generated with a series of delay cells. FIG. 9 shows an example of a signal operation during a beginning of operation of the enable generating circuit 606. In this example, TX_Start 902 becomes active (high) when an apparatus that includes the fingerprint detection device indicates that fingerprint detection should begin. Signal 904 is continuously operating in this example at 250 kHz. The 250 kHz frequency does not need to be the same as the TX frequency. At the fifth rising edge of 904 after TX_Start 902 becomes active, EN_COMP becomes high at time 914 (between 16 us and 20 us according to this example). Alternatively, EN_COMP can be made to go high on any other predetermined rising edge of 904 after TX_Start 902 becomes active.

Figure 10:
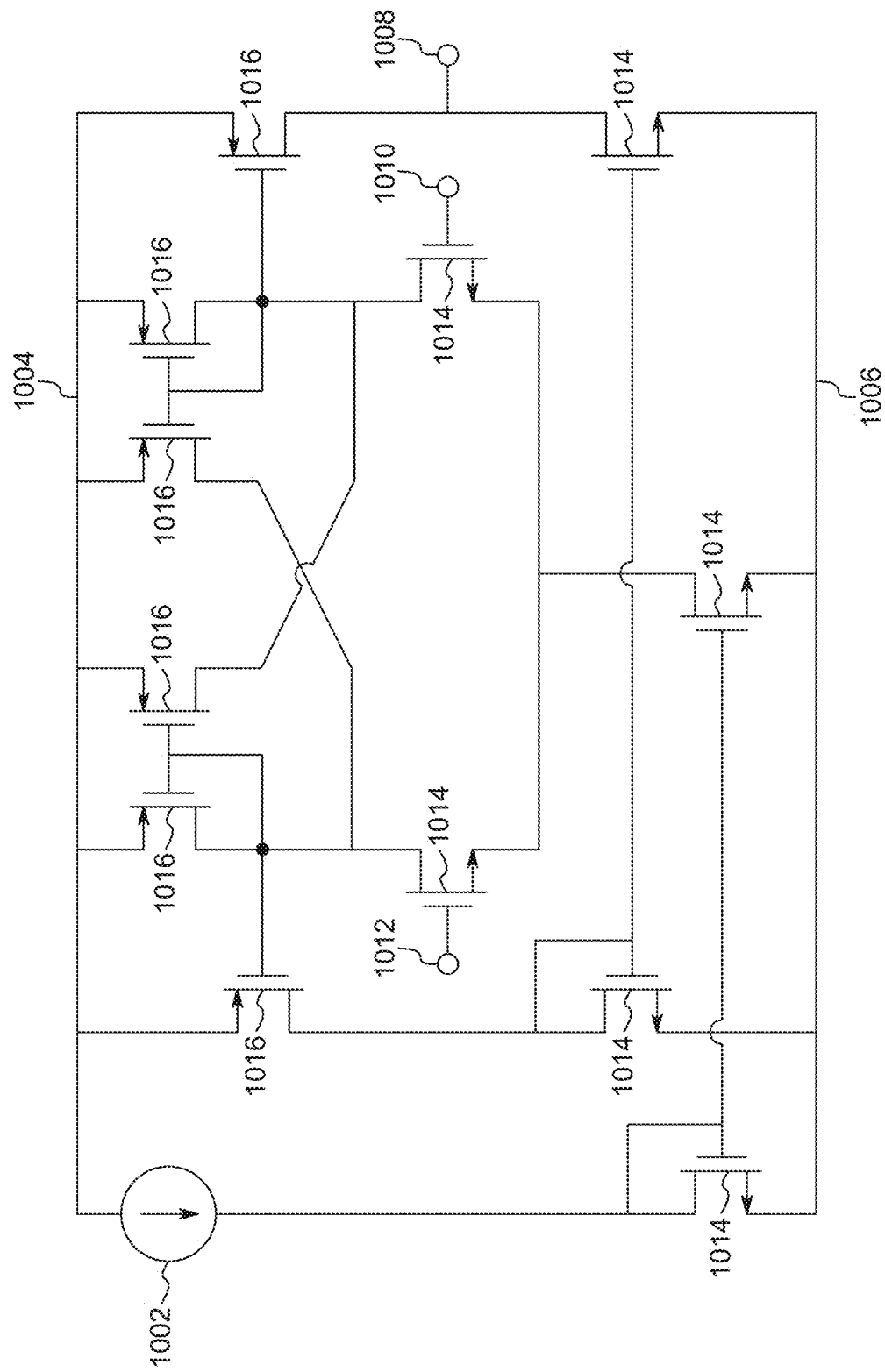
FIG. 10 shows an example of an implementation of the comparator.

FIG. 10 shows a possible implementation of the comparator 608, including transistors 1014 and 1016, and bias current source 1002 connected to VDD 1004 and VSS 1006. Negative (i.e., inverting) input 1012 and positive (i.e., non-inverting) input 1010 receive a differential input signal, and the comparator output is provided at node 1008. The comparator has hysteresis using internal positive feedback to function properly in a noisy environment. To reduce power consumption, the bias current source may be disabled after EN_CLK is high, for example, based on counters or logic gates.

Figure 11:
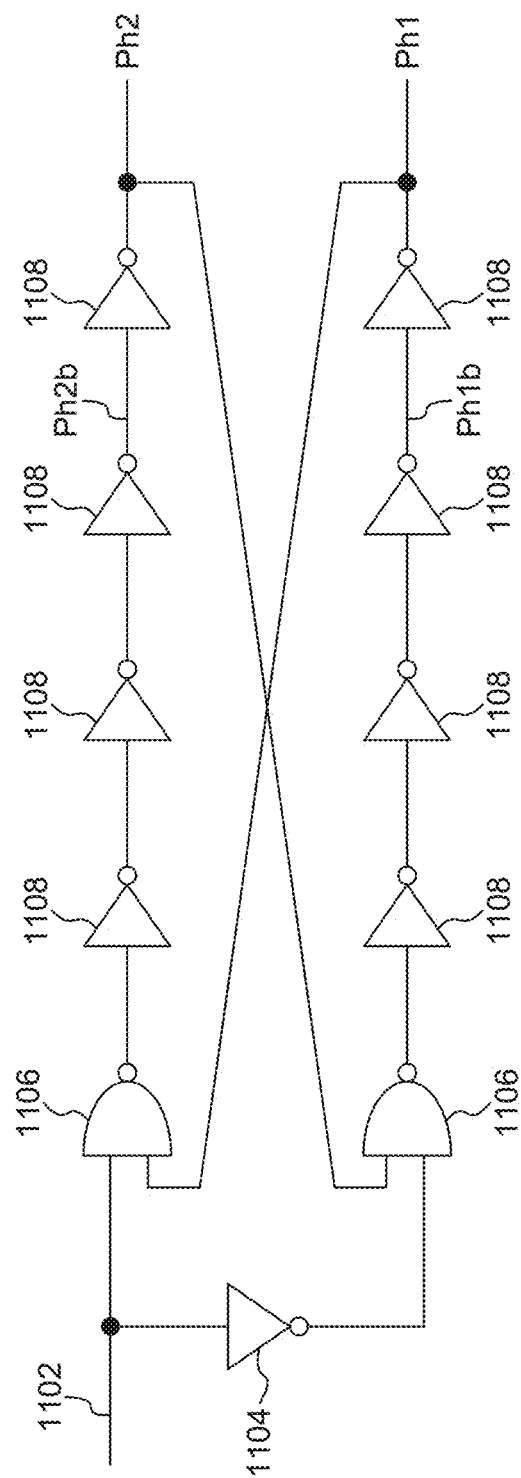
FIG. 11 shows an example of an implementation of a first portion of a mixer.

FIG. 11 shows a possible implementation of a first portion of the mixer 624 and includes inverters 1104 and NAND gates 1106 arranged to generate the non-overlapping outputs Ph1 and Ph2, and their inverse Ph1*b* and Ph2*b* respectively from input signal 1102.

Figure 12:
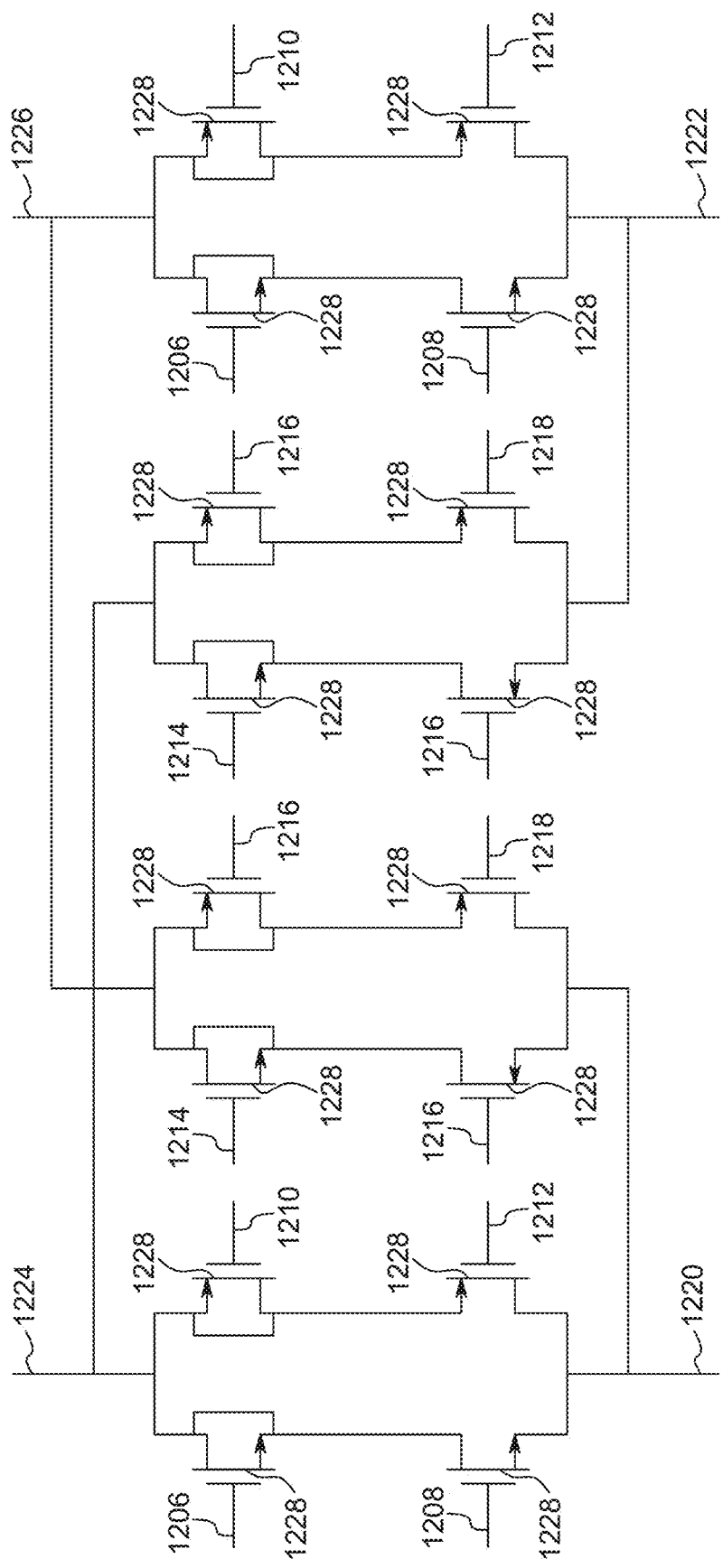
FIG. 12 shows an example of an implementation of a second portion of the mixer.

FIG. 12 shows a possible implementation of a second portion of the mixer 624 and includes transistors 1228 connected to positive input 1222 and negative input 1220 that receive the amplified differential detection signal 610 and generate inverting output 1224 and non-inverting output 1226 to output the demodulated detection signal 630.

Switching of the transistors 1228 is controlled by signals Ph1, Ph2, Ph1*b*, and Ph2*b* as shown in FIG. 11.

Figure 13:
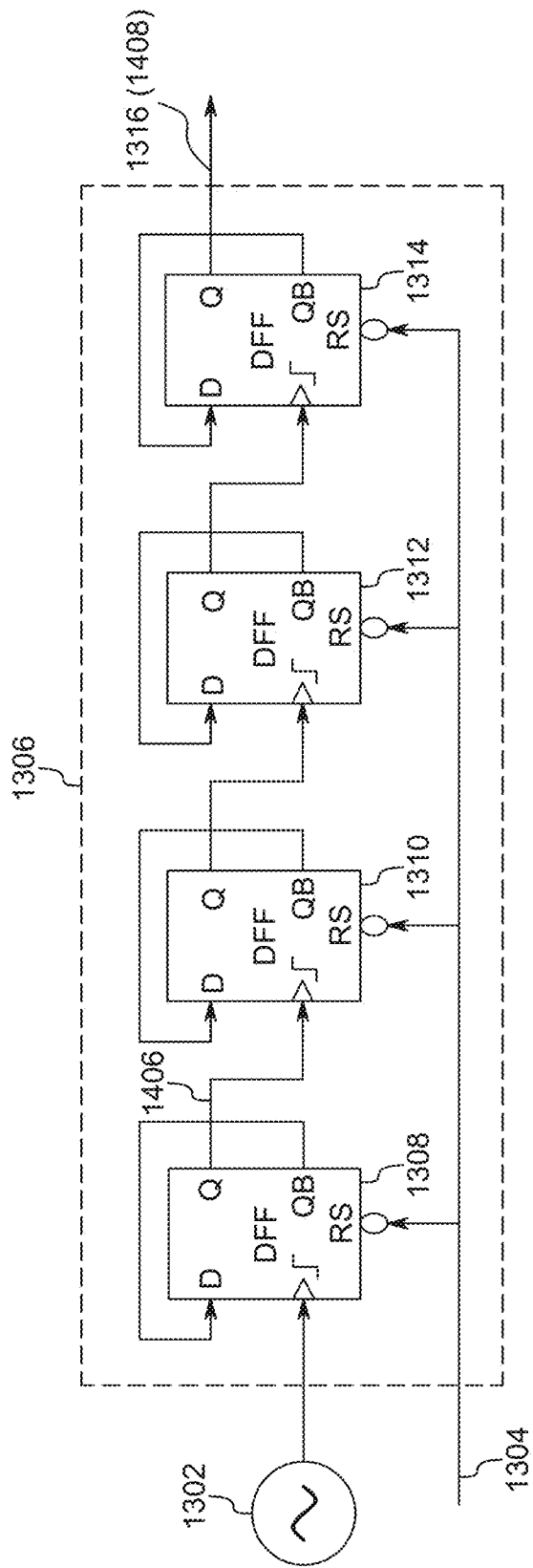
FIG. 13 shows an example of an implementations of a clock generator circuit.

FIG. 13 shows an implementation of a clock generator circuit 620 that includes a free-running oscillator 1302 (e.g., 32 MHz oscillator), and a logic circuit 1306 including D flip-flops 1308, 1310, 1312, and 1314. The non-inverting Q output of the last of the serially connected D flip-flops outputs automatic mixer control signal 1316 to the mixer 624. The free-running clock 1302 output signal runs continuously and therefore is present before EN_CLK goes high. The logic circuit 1306 implements a frequency divider using the free running clock 1302 as an input clock, having a frequency selected to be readily available within the apparatus that includes the fingerprint detector, fast enough to minimize the delay between EN_CLK going high and the start of the automatic mixer control signal provided to the mixer, and without being too fast to result in excessive power consumption, cost increases and increased risk of stray signal noise. The free-running clock 1302 in this example is preferably 32 MHz, resulting in max delay between EN_CLK going high and the start of the adaptive control signal provided to the mixer of 31.25 ns.

Figure 14:
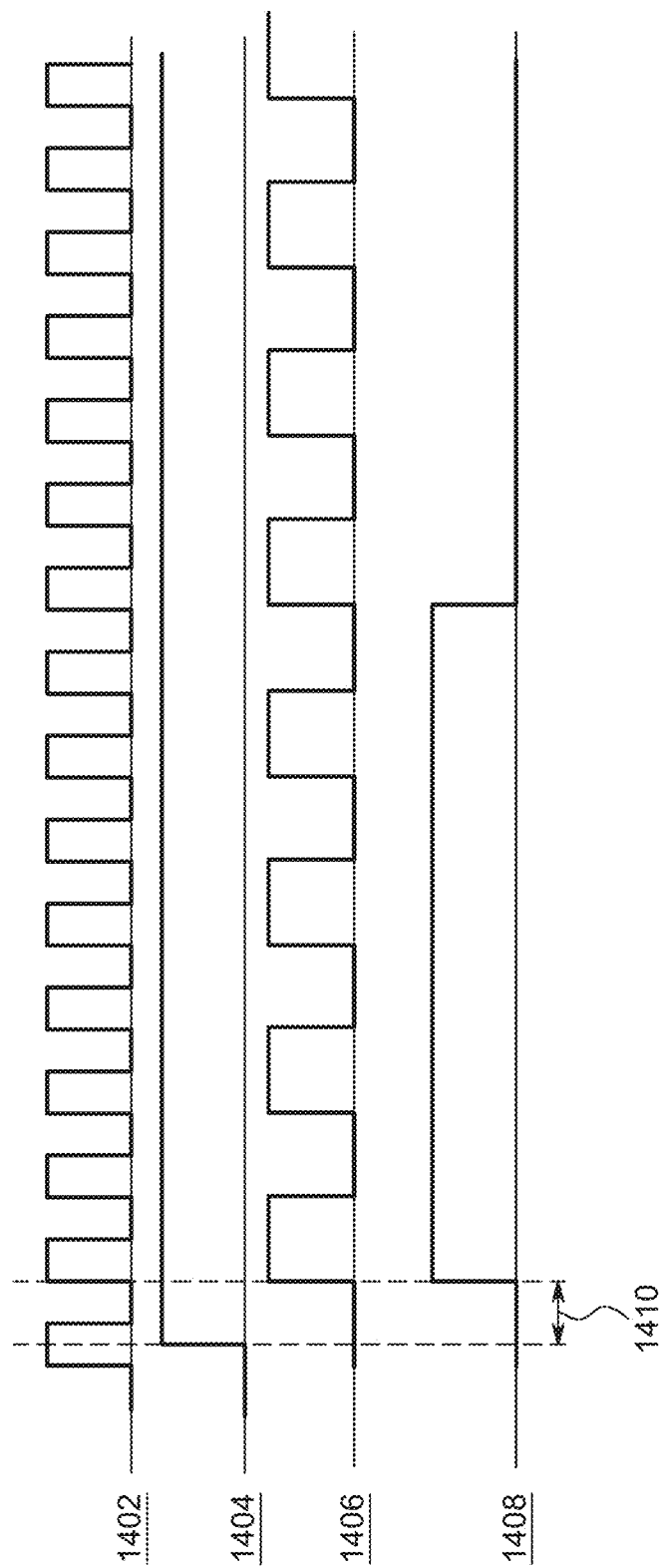
FIG. 14 shows an example of an operation of the clock generator circuit.

FIG. 14 shows an example of an operation of the clock generator circuit 620. According to this example, a free running clock 1402 operates at, for example, 32 MHz. After input signal EN_CLK 1404 goes high, on the next rising edge of the free running clock 1402, divided down clocks 1406 (i.e., the non-inverting Q output of D flip flop 1308) and 1408 (i.e., the non-inverting Q output of D flip flop 1314) start running. The output automatic mixer control signal 1408 remains high (active) for four clock cycles of the half frequency. According to this example, the delay 1410 from EN_CLK 1404 going high to the output automatic mixer control signal 1408 going high is less than or equal to 31.25 ns.

The fingerprint detection apparatus may advantageously be implemented on different portions of the same integrated circuit (e.g., a sensor Analog Front End (AFE) integrated circuit or a system on chip (SOC) integrated circuit) for a more efficient layout and to reduce the risk of high frequency signal portions corrupting other portions with coupled signal noise.

Figure 15:
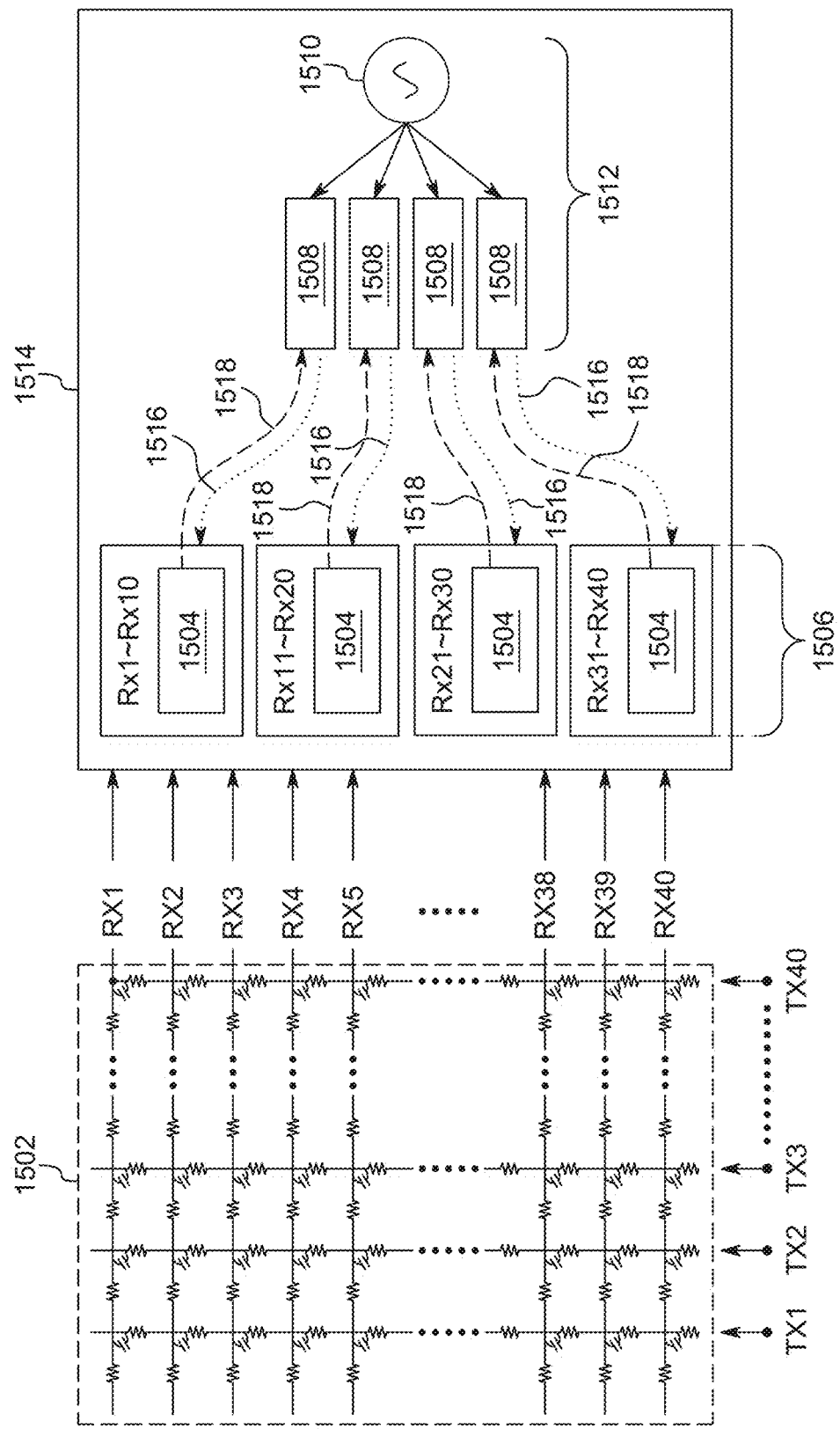
FIG. 15 shows an example of an integrated circuit floorplan for the fingerprint detection apparatus.

FIG. 15 shows an integrated circuit floor-plan that locates different portions of the fingerprint detection apparatus in different areas of the same integrated circuit 1514. According to this example, a detection panel 1502 includes an array of capacitive and resistive elements arranged in rows and columns. Each column is driven by a time varying fingerprint transmitter signal TX1-TX40, and a received signal RX1-RX40 (e.g., each corresponding to detection signal 107) is output. The integrated circuit 1514 includes four phase detectors 1504, the output of each phase detector 1504 is shared by 10 RX channels. Each phase detector 1504 takes inputs from one channel only. Therefore, no dedicated multiplexing device is needed. This is because nearby channels are expected to have very similar propagation delay, so nearby channels can share the phase detector's output EN_CLK, too. For example, the top 1504 in FIG. 15 can take inputs from RX5 and RX1-RX10 all use the same adaptive mixer control signal 1516. The integrated circuit 1514 also includes four frequency dividers 1508, each connected to send an adaptive mixer control signal 1516 and receive EN_CLK 1518 to/from a corresponding one of the phase detectors 1504. Alternatively, each RX can also have its own phase detector 1504 and frequency divider 1508, if circuit complexity is not a concern. Additionally, the integrated circuit 1514 includes a single free-running clock oscillator 1510 (e.g., corresponding to oscillator 1302) shared by all the frequency dividers 1508. Although the number of TX and RX channels in this example is 40, the invention also applies to other numbers of TX and RX channels, for example greater than 40 or less than 40.

Each phase detector 1504 includes circuitry corresponding to the functionality of the phase detector 612 in FIG. 6. Each frequency divider 1508 and a single free-running clock oscillator 1510 include circuitry corresponding to the functionality of the clock generator circuit 620 in FIG. 6.

According to this floor-planning example, only EN_CLK and the adaptive mixer control signal provided to the mixer are routed across longer distances in the integrated circuit, and the high frequency free-running clock (e.g., 32 MHz clock 1402 in FIG. 14) is not routed over long distances on the integrated circuit. Further, according to this example, each channel (i.e., each RX row) has a dedicated corresponding mixer, but multiple channels can share one phase detector and one frequency divider. In particular, the output of only one receive channel in a plurality of receive channels (e.g., only receive channel RX5 out of receive channels RX1-RX10) is provided to the phase detector, while the other outputs of receive channels RX1-4 and RX6-10 remain unconnected. Furthermore, a same frequency divider output signal may be provided in common to a plurality of RX channels (e.g., the output of one frequency divider is provided in common to the inputs of all of receive channels RX1-RX10, while a different frequency divider output is provided in common to all of receive channels RX11-20). This floor plan places frequency divider 1508 next to free running clock oscillator 1510, so the area of region 1512 that has high frequency signals can be minimized. This floor-planning strategy is especially useful when chip area is big and may advantageously allow signals to be routed so that a fast running clock is not distributed throughout all portions of the integrated circuit.

Also, a single free-running clock oscillator 1510 is shared by all four frequency dividers 1508. The floor plan according to this example can minimize interference to analog circuits (e.g., amplifier stage 112) by signals propagating in the high frequency components in the area of region 1512.

FIGS. 16-19 show examples of operation of the fingerprint detector according to the second embodiment in which a TX 1602 is provided to a detection panel 102. In these examples, signal 1604 corresponds to the CA Diff Out signal 210 in FIG. 2. In FIG. 16, after propagating through the detection panel 102 and an amplifier stage 112, an amplified differential detection signal 1606 (corresponding to amplified differential detection signal 114) is generated. EN_COMP 1612 goes high at time 1617. Adaptive mixer control signal 1616 (corresponding to adaptive mixer control signal 640) starts cycling at time 1614, and runs at the same frequency as TX 1602, but with phase delayed to correspond to the zero crossing times of the amplified differential detection signal 1606. First zero crossing 1608 and second zero crossing 1610 indicate the first and second zero crossings after EN_COMP 1612 goes high. In this example, first zero crossing 1608 is actually a false zero crossing, because amplified differential detection signal 1606 is not zero at time 1617. However, because there are two D flip flops 616 and 618 in series, instead of one, the false zero crossing at 1617 is ignored by clock generator circuit 620 and the adaptive mixer control signal 1616 doesn't begin until time 1614. A demodulated detection signal 1620 (corresponding to demodulated detection signals 630 and 120) is output by the mixer and provided to the low-pass filter 626. According to this example, the input to the mixer, amplified differential detection signal 1606, cycles at the frequency of TX 1602, but with a phase shift caused by propagation delays through the detection panel. EN_COMP 1612 goes active when the positive comparator inp 1010 is greater than negative comparator inn 1012 but the counter makes sure that the adaptive control signal provided to the mixer starts at the time of the comparator positive input zero crossing. Low Pass Filter output waveform 1622 shows the output of the LPF 626 in this example.

In the example of FIG. 17, amplified detection signal 1706, EN_COMP 1712, adaptive mixer control signal 1716, and demodulated detection signal 1720 are shown in a condition where positive comparator inp 1010 is less than negative comparator input inn 1012 when EN_COMP 1712 goes HIGH. Low Pass Filter output waveform 1722 shows the output of the LPF 626 in this example.

Figure 18:
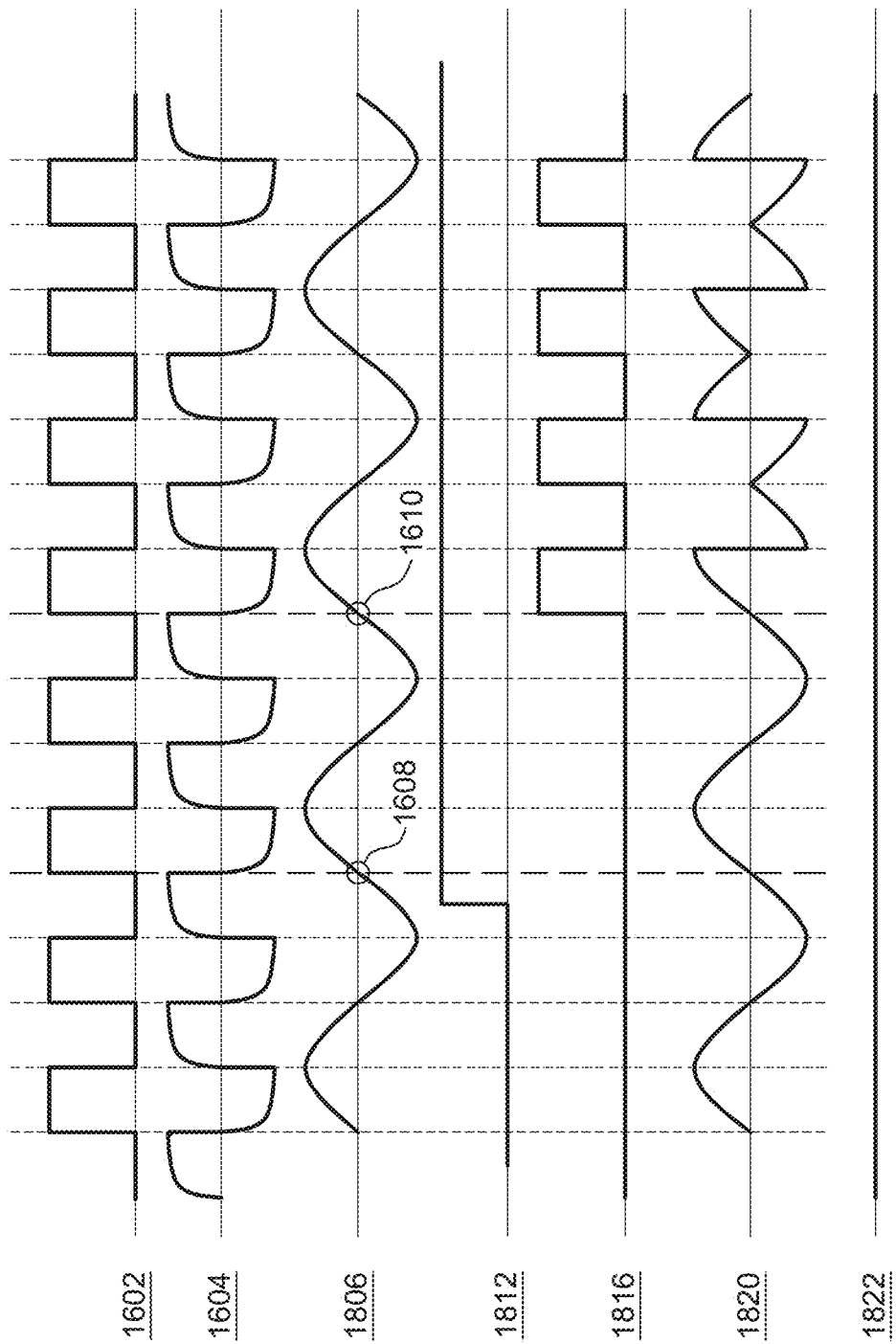
FIG. 18 shows a third example of operation of the fingerprint detector according to the second embodiment.

In the example of FIG. 18, amplified detection signal 1806, EN_COMP 1812, automatic mixer control signal 1816, and demodulated detection signal 1820 are shown in a condition where the mixer input signal 610 (equivalent to 114 or 224) has an incorrect frequency, e.g., in a case where a strong noise is coupled into the signal path (e.g., signals 100, 107, 114 in FIG. 1, and signals 202, 210, 224 in FIG. 2) and overwhelms the desired signal. The signal cannot be rectified in this case, and the LPF 626 advantageously filters out the noise, as shown by Low Pass Filter output waveform 1822, which shows the output of the LPF 626 in this example.

Figure 19:
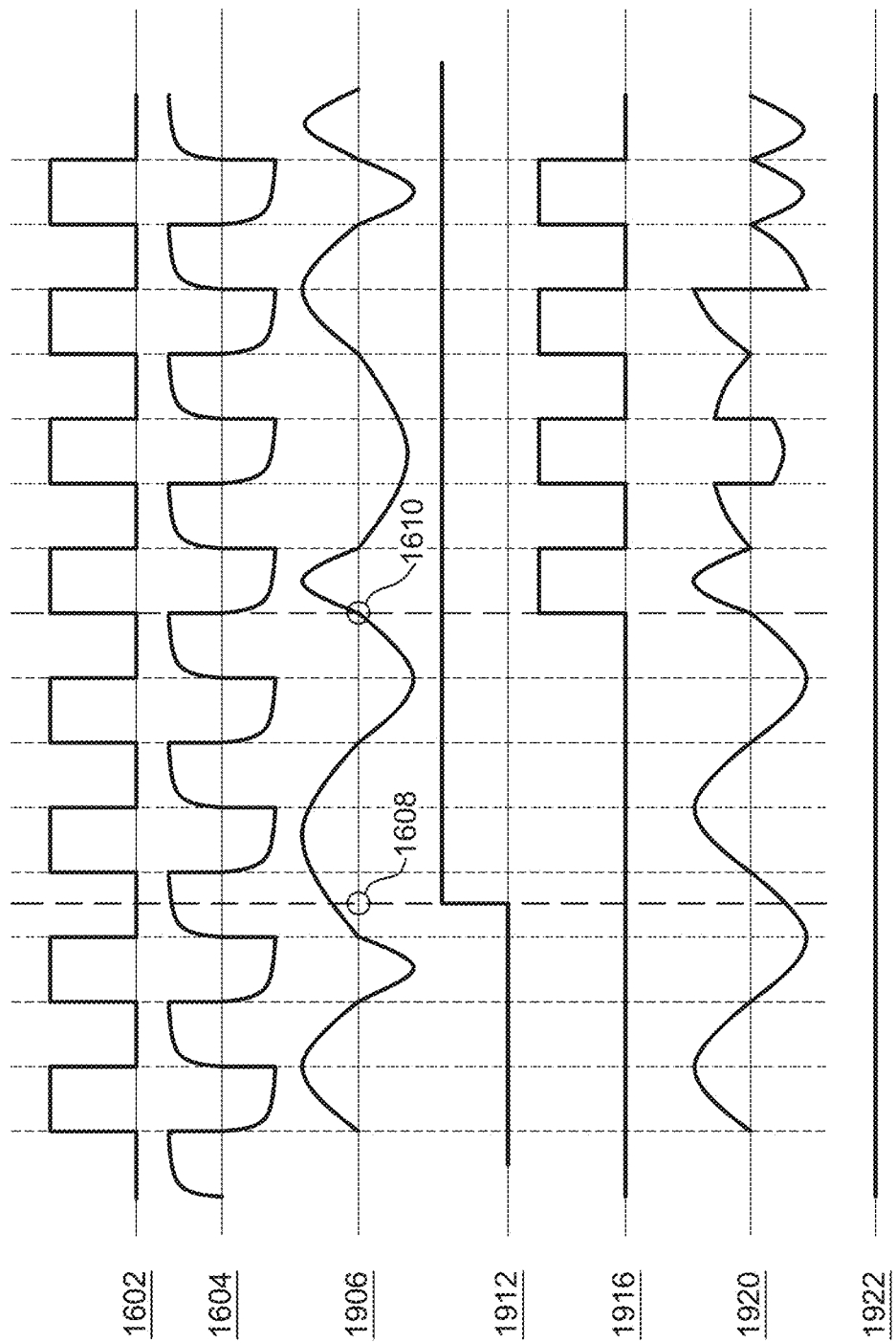
FIG. 19 shows a fourth example of operation of the fingerprint detector according to the second embodiment.

In the example of FIG. 19, amplified detection signal 1906, EN_COMP 1912, automatic mixer control signal 1916, and demodulated detection signal 1920 are shown in a condition where the mixer input signal 610 (e.g., equivalent to signal 114 or 224) is not periodical, so it can't be rectified, and will instead be advantageously filtered out by the LPF 626, as shown by the Low Pass Filter output waveform 1922.

What is claimed is:

1. A touch detecting system comprising:
   a transmitter circuit that generates a transmitter signal;
   a detection panel that receives the transmitter signal and generates a detection signal based on the transmitter signal and an object placed in proximity to the detection panel, the detection signal including information about the object placed in proximity to the detection panel; and
   a receiver circuit that receives the detection signal, the receiver circuit including
      a control circuit that determines, each time a transmitter start signal becomes active, a delay time to add when generating an adaptive control signal, the transmitter start signal indicating a start of operation of the transmitter signal,
      a mixer circuit that receives the detection signal and the adaptive control signal, and outputs a demodulated detection signal based on the detection signal and the adaptive control signal, and
      an output circuit that receives the demodulated detection signal and outputs an output detection signal that includes the information about the object placed in proximity to the detection panel,
   wherein the control circuit includes
      an enable generating circuit that outputs a comparator enable signal based on a first free running clock signal and the transmitter start signal,
      a comparator circuit that outputs a comparison output signal based on the comparator enable signal and the detection signal,
      a delay determining circuit that outputs a clock enable signal based on the comparison output and the comparator enable signal, and
      a clock generator circuit that outputs the adaptive control signal based on the clock enable signal.

2. The touch detecting system according to claim 1, wherein
   each time the transmitter start signal becomes active, the control circuit determines a phase delay of the adaptive control signal based on the detection signal, a first free running clock signal, and the transmitter start signal.

3. The touch detecting system according to claim 1, further comprising:
   at least one amplifier stage that amplifies the detection signal for use by the mixer circuit.

4. The touch detecting system according to claim 1, further comprising:
   a control circuit that determines to activate the transmitter start signal when a touch detection operation should begin.

5. The touch detecting system according to claim 1, where the control circuit is configured to determine a different phase delay of the adaptive control signal each time the transmitter start signal becomes active.

6. The touch detecting system according to claim 1, wherein the information about the object placed in proximity to the detection panel includes information about a location of the object with respect to the detection panel.

7. The touch detecting system according to claim 1, wherein
   the object placed in proximity to the detection panel is a finger, and
   the information about the object placed in proximity to the detection panel includes information that uniquely identifies a fingerprint of the finger.

8. The touch detecting system according to claim 1, wherein the output circuit includes a low pass filter that receives the demodulated detection signal and outputs a low pass filtered signal as the output detection signal.

9. The touch detecting system according to claim 1, wherein the enable generating circuit outputs the comparator enable signal to become active on a predetermined cycle of the first free running clock signal after the transmitter start signal becomes active.

10. The touch detecting system according to claim 1, wherein
    the comparator circuit outputs the comparison output signal to become active when the detection signal transitions from negative to positive and inactive when the detection signal transitions from positive to negative,
    the delay determining circuit outputs the clock enable signal to become active after at least one cycle in which the comparison output signal becomes active and inactive, and
    the delay determining circuit outputs the clock enable signal to become inactive after the transmitter start signal becomes inactive.

11. The touch detecting system according to claim 1, wherein the clock generator circuit outputs the adaptive control signal as a second free running clock only while the clock enable signal is active.

12. The touch detecting system according to claim 1, wherein the enable generating circuit includes five D flip-flops connected in series, with the transmitter start signal connected to a reset input of each of the five D flip-flops connected in series, the first free running clock signal connected to a clock input of each of the five D flip-flops connected in series, an always active signal connected to a D input of the first D flip-flop in the five D flip-flops connected in series, a non-inverting output of each of the first, second, third, and fourth of the five D flip-flops connected in series being connected to a D input of the second, third, fourth, and fifth D flip-flops connected in series, respectively, and a non-inverting output of the fifth D flip-flop connected in series outputting the comparator enable signal.

13. The touch detecting system according to claim 1, wherein the delay determining circuit includes two D flip-flops connected in series, an always active signal connected to a D input of a first of the two D flip flops connected in series, the comparator output signal connected to a clock input of each of the two D flip-flops connected in series, the comparator enable signal connected to a reset input of each of the two D flip-flops connected in series, a non-inverting output of the first D flip-flop of the two D flip-flops connected in series is connected to a D input of the second D flip-flop of the two D flip-flops connected in series, and a non-inverting output of the second D flip-flop of the two D flip-flops connected in series is output as the clock enable signal.

14. The touch detecting system according to claim 1, wherein the delay determining circuit includes a D flip-flop and a delay line, an always active signal connected to a D input of the D flip-flop, the comparator output signal connected to a clock input of the D flip-flop, the comparator enable signal connected to an input of the delay line, an output of the delay line connected to a reset input of the D flip-flop, and a non-inverting output of the D flip-flop is output as the clock enable signal.

15. The touch detecting system according to claim 14, wherein the delay line produces a propagation delay of a signal from the input of the delay line to the output of the delay line that is greater than a propagation delay of the comparator.

16. A touch detecting receiver that receives a detection signal indicating information about an object placed in proximity to the detection panel from a detection panel and a transmitter start signal from a controller indicating a start of operation of the transmitter signal, the touch detecting receiver circuit comprising:
    a control circuit that determines, each time the transmitter start signal becomes active, a delay time to add when generating an adaptive control signal;
    a mixer circuit that receives the detection signal and the adaptive control signal, and outputs a demodulated detection signal based on the detection signal and the adaptive control signal; and
    an output circuit that receives the demodulated detection signal and outputs an output detection signal that includes the information about the object placed in proximity to the detection panel,
    wherein the control circuit includes
        an enable generating circuit that outputs a comparator enable signal based on a first free running clock signal and the transmitter start signal,
        a comparator circuit that outputs a comparison output signal based on the comparator enable signal and the detection signal,
        a delay determining circuit that outputs a clock enable signal based on the comparison output and the comparator enable signal, and
        a clock generator circuit that outputs the adaptive control signal based on the clock enable signal.

17. A method of detecting an object placed in proximity to a detection panel, the method comprising:
    receiving a detection signal from the detection panel, the detection signal including information about the object placed in proximity to the detection panel;
    receiving a transmitter start signal from a controller indicating a start of operation of the transmitter signal;
    determining, each time the transmitter start signal becomes active, a delay time to add when generating an adaptive control signal;
    generating the adaptive control signal;
    receiving, by a mixer circuit, the detection signal and the adaptive control signal;
    outputting, from the mixer circuit, a demodulated detection signal based on the detection signal and the adaptive control signal;
    outputting the demodulated detection signal as an output detection signal that includes information about the object placed in proximity to the detection panel;
    outputting a comparator enable signal based on a first free running clock signal and the transmitter start signal;
    outputting a comparison output signal based on the comparator enable signal and the detection signal;
    outputting a clock enable signal based on the comparison output and the comparator enable signal; and
    outputting the adaptive control signal based on the clock enable signal.

\* \* \* \* \*